United States Patent [19]
Sedlmayr

[11] Patent Number: 5,010,982
[45] Date of Patent: Apr. 30, 1991

[54] METHOD AND APPARATUS FOR IMPROVING VEHICLE TRACTION AND ROADABILITY

[75] Inventor: Joachim Sedlmayr, Lisle, Ill.

[73] Assignee: Robert Bosch GmbH, Stuttgart, Fed. Rep. of Germany

[21] Appl. No.: 390,035

[22] Filed: Aug. 7, 1989

[30] Foreign Application Priority Data

Aug. 6, 1988 [DE] Fed. Rep. of Germany ....... 3826775

[51] Int. Cl.$^5$ .............................................. B60C 27/00
[52] U.S. Cl. ................................. 188/4 B; 280/757; 152/222
[58] Field of Search .................... 291/1, 3; 280/757; 188/4 B, 4 R, 5, 6, 16; 152/208, 222, 223, 231, 232, 214, 216

[56] References Cited

U.S. PATENT DOCUMENTS

| | | | |
|---|---|---|---|
| 1,144,540 | 6/1915 | Haberstick | 180/7.1 |
| 2,885,030 | 5/1959 | Aikman | 280/757 |
| 3,415,537 | 12/1968 | Goggins | 280/757 |
| 3,658,158 | 4/1972 | Saupp | 188/4 B |
| 3,797,867 | 3/1974 | Hartl | 291/3 |
| 3,889,991 | 6/1975 | Hewitt | 291/1 |
| 4,054,304 | 10/1977 | Sirois | 188/4 B |
| 4,316,625 | 2/1982 | Goon et al. | 291/1 |
| 4,751,975 | 6/1988 | Rieger et al. | 188/4 B |
| 4,800,939 | 1/1989 | Torneback | 188/4 B |
| 4,809,797 | 3/1989 | Guyot | 188/4 B |
| 4,840,399 | 6/1989 | Rieger et al. | 188/4 B |

FOREIGN PATENT DOCUMENTS 0078392 3/1986 European Pat. Off. .

*Primary Examiner*—Richard A. Bertsch
*Attorney, Agent, or Firm*—Edwin E. Greigg

[57] ABSTRACT

To improve traction and roadability in motor vehicles, particularly trucks or buses, it is proposed that when a traction control means comes into play, suitable traction-promoting systems such as special chains or gravel spreaders are automatically activated, by triggering suitable adjusting cylinders for the traction-promoting systems simultaneously with the ASR valve.

21 Claims, 4 Drawing Sheets

METHOD AND APPARATUS FOR IMPROVING VEHICLE TRACTION AND ROADABILITY

BACKGROUND OF THE INVENTION

The invention is directed to an improved and apparatus for enhancing vehicle traction and skid resistance.

By means of the known possibility of combining an anti-skid system (ABS) with traction control (ASR), it is possible for existing components such as wheel sensors, control elements and the like, provided for ABS operation, to be used for traction control as well, thus expanding the possibilities of the ABS system. See, for example, the article entitled "Systeme antiblocage avec fonctions elargies"[Anti-skid system with expanded functions] by Erich Reinecke, published in the journal "Ingenieurs de l'Automobile"[Automotive Engineers], pages 110–116. The basic functions of an ABS system expanded to include traction control is then that even during startup, a control of the wheel movements is effected, although in more or less the reverse direction from what is done in the ABS system, in that the sensors provided for the ABS system detect any spinning of (driven) wheels and by triggering suitable control elements assure that the brake pressure for the spinning wheel is increased, so that this wheel is braked until normal grip of the wheel on whatever road surface is present is re-established. Traction control of this kind is not only advantageous for preventing high-powered passenger cars from spinning their wheels on starting up, but is also preferentially used for increasing traction and improving roadability especially in winter driving conditions, so that even on icy or snowy slopes starting up is still possible, and spinning of one of the driven wheels can be avoided, should that wheel happen to be on a surface having a low coefficient of friction. This traction controller, known generally as anti-skid reduction (or ASR) accordingly works somewhat like a locking differential, but avoids the disadvantages of that device, and as a way to increase traction and roadability of motor vehicles it is also favorable from the cost standpoint because it makes further use of components already present for ABS systems.

To increase the coefficient of friction, especially under winter driving conditions, it is also known (see publication VDT-UBB 160 (10.56), "Bosch-Splittstreuer" [Bosch Gravel Spreader], Robert Bosch GmbH, Stuttgart, Federal Republic of Germany), to dispose gravel bins ahead of at least the driven wheels of motor vehicles, especially trucks or buses, so that upon separate manual actuation of a pushbutton or switch by the driver, and therefore dependent upon his decision, gravel can be spread ahead of driven wheels as needed, over relatively short or not so short distances. To this end, a rotary slide actuated by compressed air via an electromagnetic control valve is associated with each gravel spreader container and also actuates a shaft for breaking apart clumped-together gravel.

A similar effect can be achieved by using centrifugal chains (see the journal, *Nutzfahrzeug* [Utility Vehicle], Nov. 1986, pages 52–54), which can be disposed in various ways in the region of the driven wheels of motor vehicles, primarily buses or trucks, in such a way that on the one hand the driver is spared the tedious work of putting on the chains on hills and the like, yet by arbitrary switch actuation the chains can be deployed ahead of the wheels to increase the traction. Such systems may have a pneumatic swivel mechanism for the chains. Electromechanical systems with so-called Rotogrip chain mats are also known, however. Gravel spreaders and chains improve braking under winter conditions, especially on icy hills and the like, and can also be used together with antiskid systems, as disclosed in published European Patent Application 0078392. In a road vehicle equipped with an anti-skid system, a gravel spreader is switched on automatically whenever the ABS system responds, although to save gravel the actuation does not occur until the pressure difference upstream and downstream of the regulating valves exceeds a certain magnitude and the coefficient of friction is also correspondingly low. To detect the pressure difference, a differential pressure converter is provided, followed on the output side by an evaluation circuit.

Other systems comparable to the gravel spreader are known as sand spreaders (British Patent 2,040,838 and U.S. Pat. No. 3,797,867), where by actuation of a foot or manual switch from the driver's compartment, either sand from a central storage bin can be spread ahead of the driven wheels by gravity (British Patent 2,040,838), or the friction-promoting agent is sprayed ahead of the driven wheels from the sand bin pneumatically by the generation of an air flow.

OBJECT AND SUMMARY OF THE INVENTION

It is accordingly the principal object of the invention to assure that good traction combined with safe road ability is attained during startup of a motor vehicle or while it is being driven, especially under winter driving conditions.

It is a further object of the invention to provide that the means that improve the coefficient of friction, to increase wheel grip on the road surface, are not used until an existing traction control system responds, or in other words during startup or during a drive when skidding of one or more wheels on the road surface occurs. Then, however, the action of a gravel spreader or alternatively a special chain system is initiated fully automatically, so that the driver's attention is not distracted just when the roadability of a truck or bus, for example, worsens drastically, such as on an icy hill, so that the driver can concentrate fully on driving the vehicle.

Another object of the invention is to assure that in any case, the means such as special chains or a gravel spreader that markedly increase the wheel grip at the decisive moment are in fact actuated, and that the activation of these systems will not be neglected at that moment because the driver, who at such a time is already under quite a strain, is distracted by external events. The invention therefore makes it rather certain that when driving on hills the vehicle equipped with such systems cannot skid off course, even under extremely unfavorable road conditions such as ice and the like. At the instant the traction control comes into play, the systems that increase the wheel grip are activated either at all the wheels or at only the driven wheels.

Still another object of the invention is to provide the opportunity, via throttles, of initiating a time lag in the triggering of the adjusting cylinders that activate the wheel grip promoting means. In this way, transient situations otherwise calling for traction control can be filtered out. It is yet another object to provide a switch for triggering the adjusting cylinders, so that by arbitrary intervention of the driver, triggering of the adjusting cylinders is prevented in any case while he is driving on firm ground, or when winter driving conditions are not involved.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
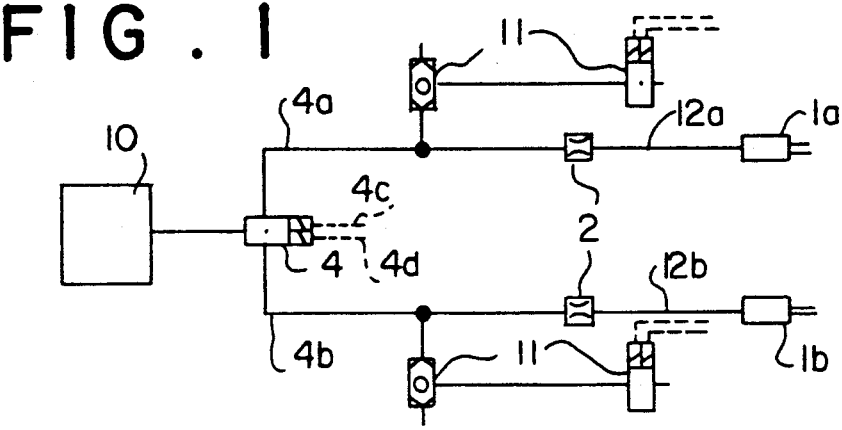
FIG. 1 shows a first exemplary embodiment of the invention, in which the triggering of the adjusting cylinders for activating special chains or the gravel spreader is effected directly, via an existing ASR valve.

The basic concept of the present invention is to make supplemental traction-promoting systems, namely special chains or a gravel spreader or other supplemental options, come into play automatically by linkage with an existing traction control (ASR), so that the traction behavior and stability of a motor vehicle so equipped can be decisively improved.

In the drawing, the ASR system, which can also be called a drive slip limiting or traction control system, is not shown separately, nor is an anti-skid or ABS system normally linked with such an ASR system, because both systems are quite well known per se and need not be described here.

Figure 1A:
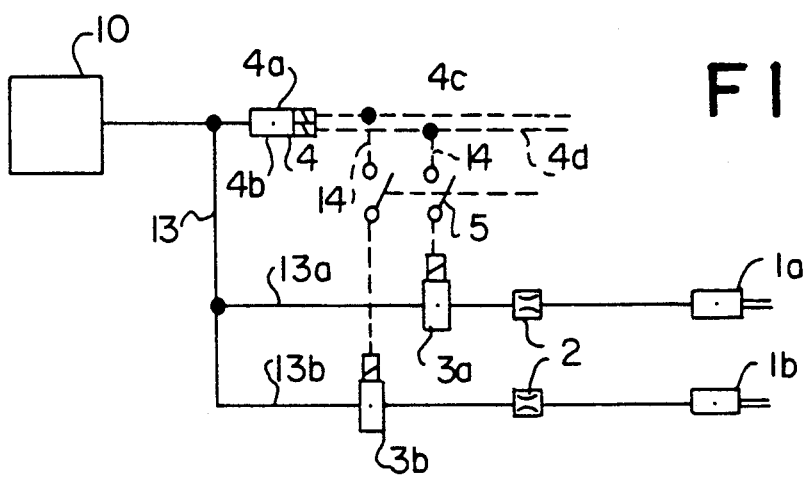
FIG. 1a, likewise schematically, shows an embodiment for triggering the adjusting cylinders by the delivery, parallel to the ASR valves, of signals to separately provided electromagnetic valves.
Figure 1B:
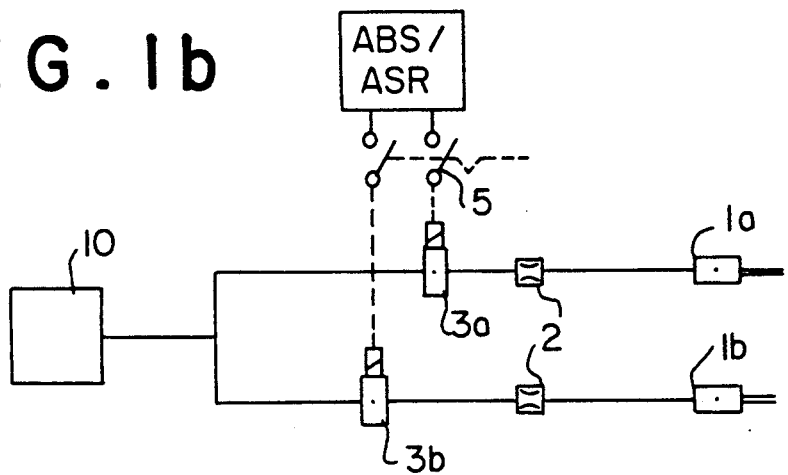
FIG. 1b is a schematically shown embodiment in which electromagnetic valves for activating special chains or a gravel spreader are triggered directly by an ABS/ASR control unit.

It will also be understood that beyond the hardware components shown in FIGS. 1, 1a and 1b, the operative circuits and components that achieve the basic function according to the invention may be discrete switching stages or blocks, but preferably some or all of them are combined so as to occupy suitable regions of program-controlled digital systems, or in other words microprocessors, computers and the like. Thus the exemplary embodiments of the invention discussed below will serve merely to explain the basic function and mode of operation of the invention and do not restrict it to the particular embodiments shown.

Figure 4:
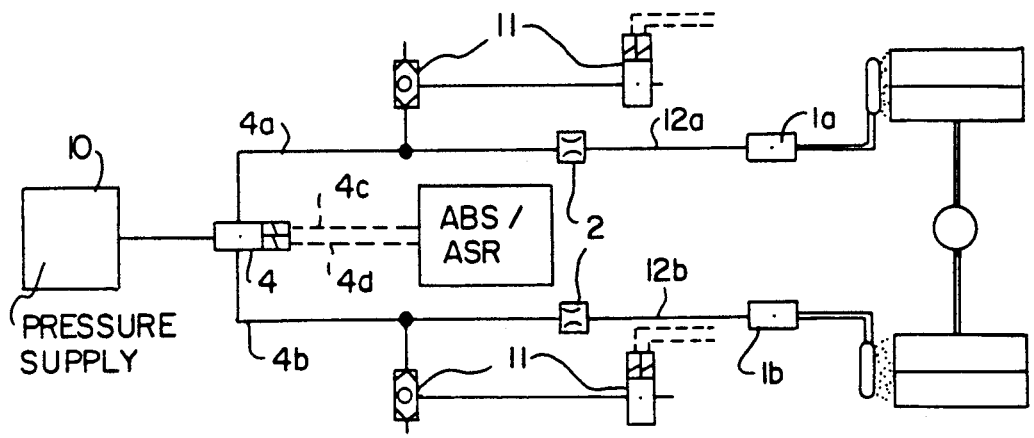
FIGS. 4, 4a, and 4b illustrate control systems such as shown in FIGS. 1, 1a, and 1b, respectively for traction control in which gravel bins are disposed ahead of the driven wheels which are opened when necessary.
Figure 4A:
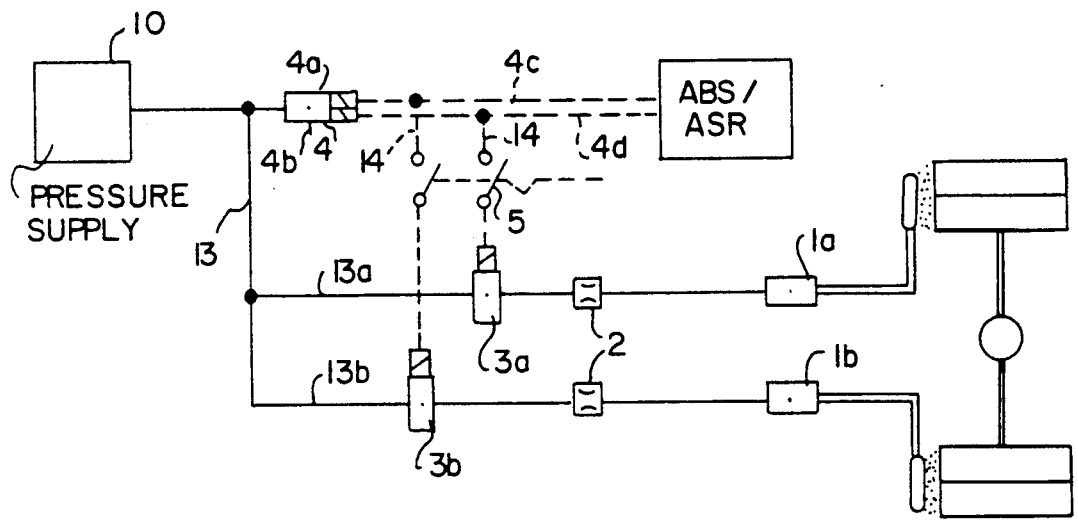
Figure 4B:
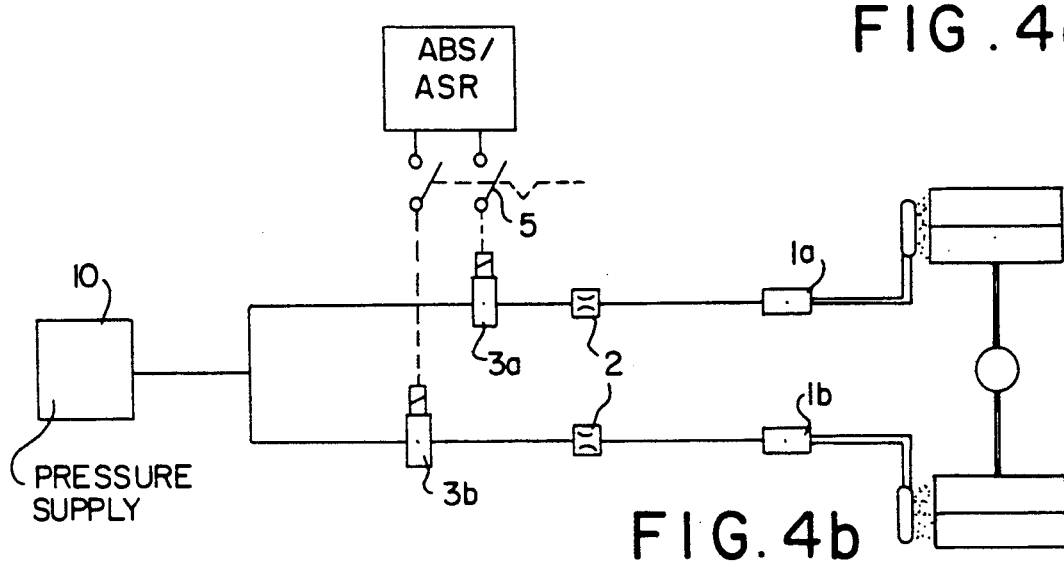

Adjusting cylinders 1a, 1b are provided, which by imposition of a suitable (pneumatic or hydraulic) pressure medium put the traction-improving systems into operation directly. Detailed explanation of these systems can be dispensed with, because the publications mentioned above can be referred to, namely the Bosch publication mentioned above for the use of a gravel spreader as shown herein by FIGS. 4, 4a, and 4b as a traction-improving system, and the article in *Nutzfahrzeug* for the general embodiment of a special chain system. The adjusting cylinders 1a and 1b therefore either directly activate shafts or rotary slides in the vicinity of the gravel spreader, and thus may for example be embodied as a gravel spreader, as shown in FIG. 1 of the Bosch publication, or by the actuation of suitable lever systems from the mechanical outlet of each adjusting cylinder 1a, 1b they bring about the deployment of special chains at the applicable wheels of the vehicle.

Figure 2:
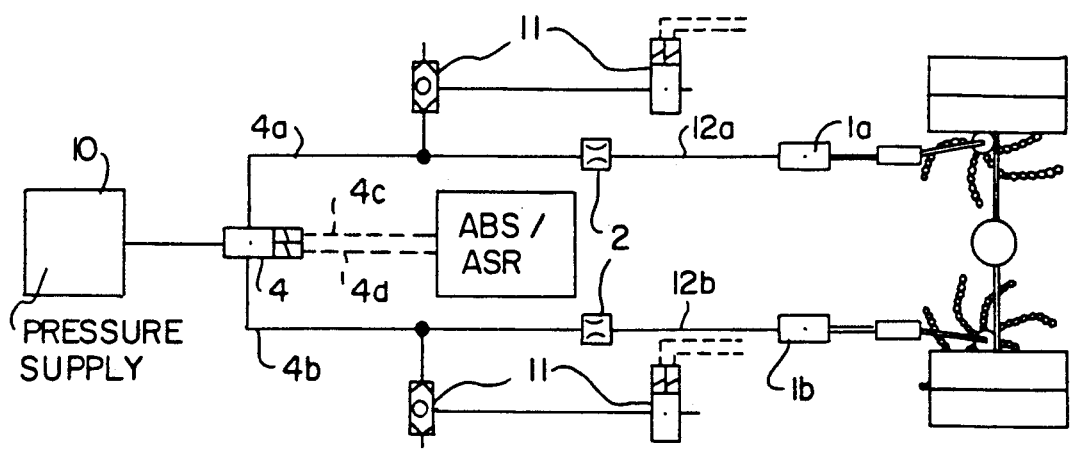
FIGS. 2, 2a, and 2b illustrate control systems such as shown in FIGS. 1, 1a, and 1b, respectively, for a lever system with traction control using auxiliary wheels provided with chains which are pressed against side portions of the wheels via a lever system.
Figure 2A:
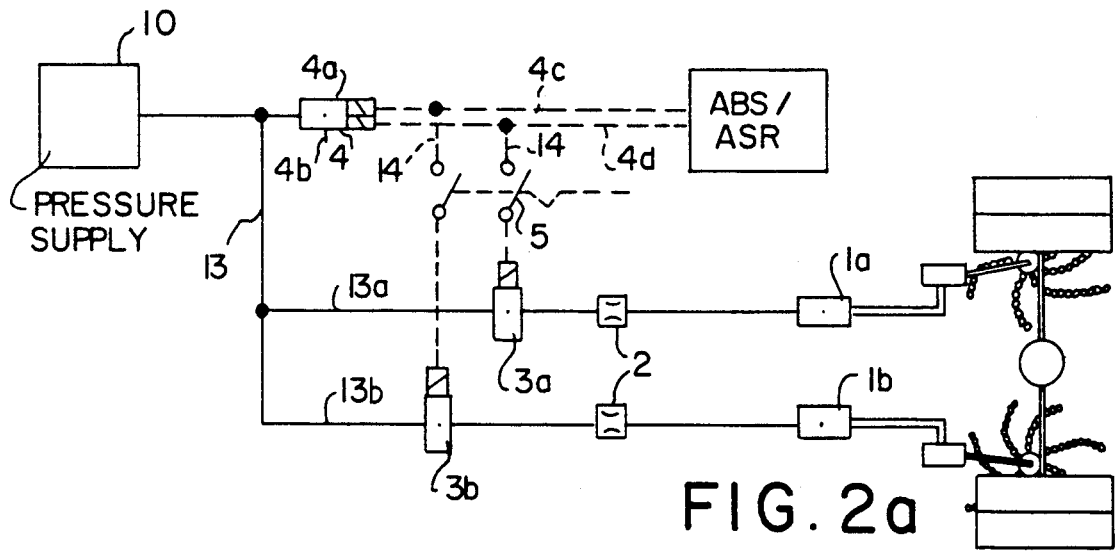
Figure 2B:
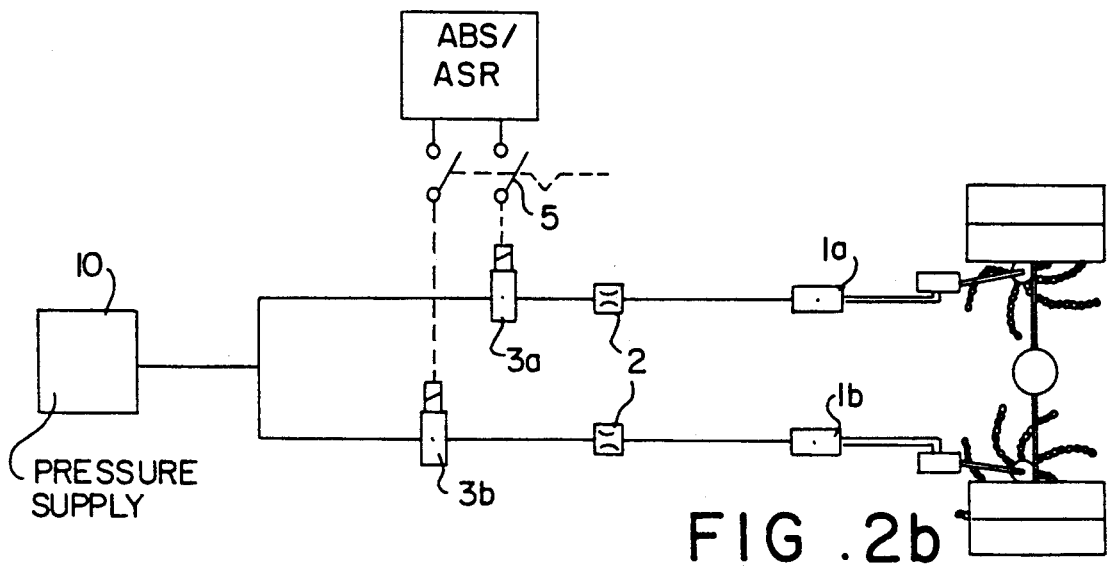
Figure 3:
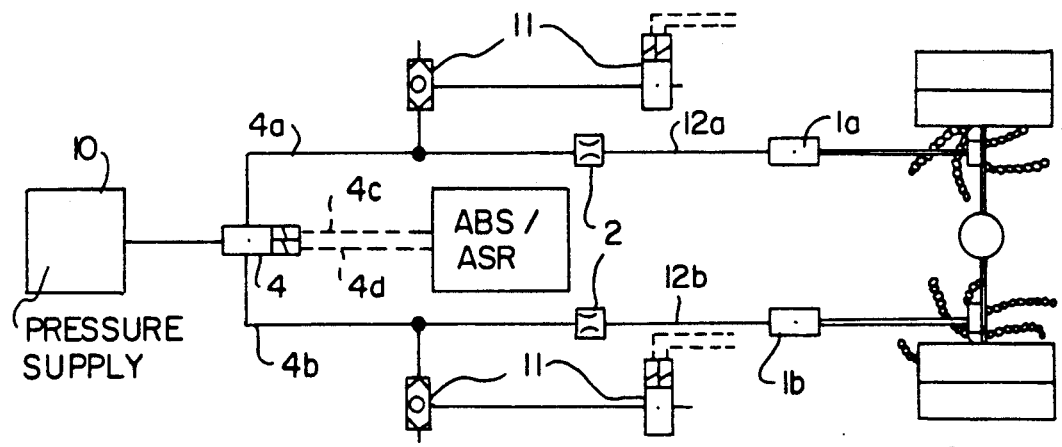
FIGS. 3, 3a, and 3b illustrate control systems such as shown in FIGS. 1, 1a, and 1b, respectively, for traction using auxiliary wheels provided with chains which are pressed against side portions of the wheels via a rack and spindle drive system.
Figure 3A:
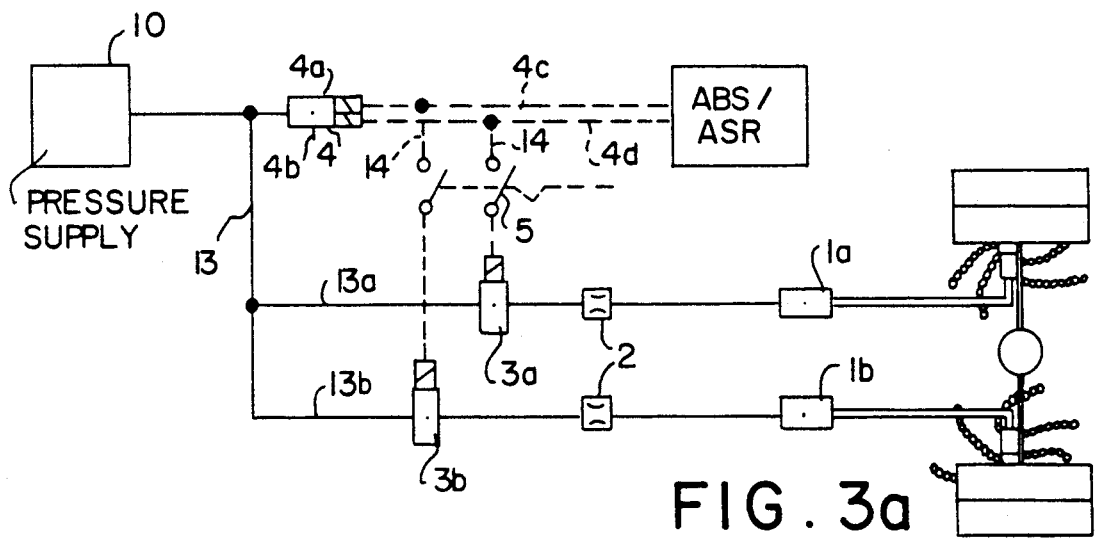
Figure 3B:
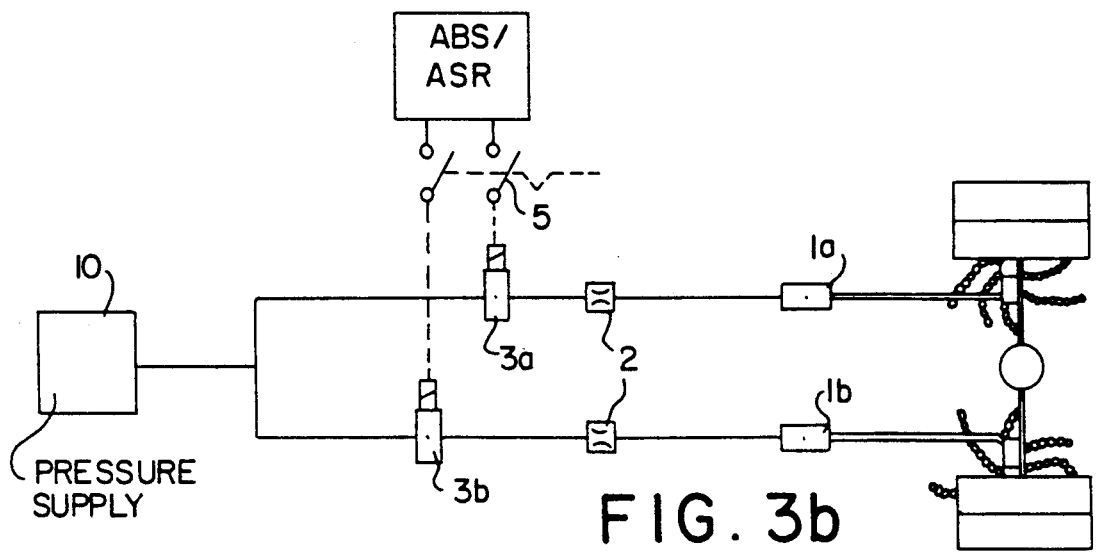

To provide further detail on this point, how this works is that extra wheels, provided with sets of chains, are pressed against the sides of the tires of the driven wheels, for instance via a lever system as shown in FIGS. 2, 2a, and 2b or a rack and spindle drive as shown in FIGS. 3, 3a, and 3b, by the terminal elements, here preferably embodied as pneumatic adjusting cylinders 1a, 1b; this simultaneously causes these wheels carrying the sets of chains to rotate, and the sets of chains are centrifugally thrown under the tire treads of those wheels of the motor vehicle.

Alternatively, or in addition, the gravel spreader can be used as a second traction-promoting system; in that case, via rotary slides, the pneumatic adjusting cylinders 1a, 1b open the drain openings of gravel bins mounted ahead of the driven wheels and spread gravel over the road to the width of the tires.

FIGS. 1, 2, 3, and 4 show a pressure supply source 10, which supplies the pressure, stored in it and kept at predetermined, preferably constant values, of the (pneumatic) pressure medium to a traction control or ASR valve 4, known per se; for traction control, via its outputs 4a, 4b in a conventional manner, this valve 4 triggers suitable brake cylinders or preceding components 11 of the wheels at which spinning has been detected, for instance by ABS sensors 20, during starting or while driving.

The triggering of the ASR valve, which may be embodied as a double-acting valve, is effected via electrical signal lines 4c, 4d by a suitably embodied ASR control unit or by a computer, in which certain parts of the program region are occupied for the sake of achieving traction control.

The triggering may also be effected by a combined ABS/ASR control unit.

It can be seen that upon activation of the ASR valve, not only are the wheel brake cylinders finally supplied with pressure medium from the pressure source 10, but via pressure medium lines 12a, 12b leading on to the adjusting cylinders 1a, 1b, these cylinders are acted upon by the pressure medium as well, so that a corresponding activation of the traction-promoting systems connected to or controlled by the ASR valve is effected.

In an advantageous embodiment, throttles 2 are incorporated into the lines 12a, 12b and provide for a time lag in the triggering of the adjusting cylinders 1a, 1b, so that brief or transient ASR demands are filtered out, and the traction-promoting systems are not switched on unnecessarily, which with a gravel spreader for instance could empty it quickly.

In the alternative embodiments shown in FIGS. 1a, 2a, 3a, and 4a for activation of the traction-promoting systems via the adjusting cylinders 1a, 1b, separate electromagnetic valves 3a, 3b are provided, the pressure inlets of which are connected, via a branch line 13 with further branches 13a, 13b, directly to the line from the pressure supply source 10, still upstream of the ASR valve. The triggering of the electromagnetic valves 3a, 3b is effected parallel to the ASR valve, in that its electrical signal lines are connected on either side via branch lines 14a, 14b to the corresponding electromagnetic valves 3a, 3b.

In this embodiment, it is possible, via a double switch 5 connected via the electrical trigger lines 14a, 14b, to completely interrupt the delivery of the ASR signals to the electromagnetic valves 3a, 3b, so that the supply of pressure medium to the adjusting cylinders 1a, 1b is prevented under driving conditions in which the use of traction improving systems is not at all necessary, such as when there is a firm surface or under other than wintry road conditions.

Finally, in the embodiments shown in FIGS. 1b, 2b, 3b, and 4b it is possible for the electromagnetic valves 3a, 3b, which supply the adjusting cylinders 1a, 1b with pressure medium from the supply 10 via the throttles 2, to be connected directly to the ABS/ASR control unit for electrical triggering, once again with the interposition of the (double) interrupter switch 5.

Any of the features shown or described herein may be essential to the invention either singly or in any desired combination with one another.

The foregoing relates to preferred exemplary embodiments of the invention, it being understood that other variants and embodiments thereof are possible within the spirit and cope of the invention, the latter being defined by the appended claims.

What is claimed and desired to be secured by Letters Patent of the United States is:

1. A method for improving traction and roadability in vehicles including wheels and wheel brake cylinders, comprising the steps of initiating a traction control means to supply control signals to at least one control valve to control flow of a pressure medium to said brake cylinders and to separate adjusting cylinders (1a, 1b), automatically evaluating signals generated by the traction control means to control said at least one fluid control valve for supplying a flow of said pressure medium to said separate adjusting cylinders (1a, 1b) for controlling separate traction promoting means for increasing the wheel grip, and activating said separate traction promoting means for increasing the wheel grip on a road surface.

2. A method for improving traction and roadability in vehicles as set forth in claim 1 which includes operating at least two control valves.

3. A method for improving traction and roadability in vehicles as set forth in claim 1 which includes operating at least three control valves.

4. A method as defined by claim 1, further comprising a step of throttling said flow of said pressure medium to the adjusting cylinders so as to suppress transient demands of said traction control means and avoid premature deployment of said separate traction promoting means for increasing wheel grip.

5. A method for improving traction and roadability in vehicles as set forth in claim 4 which includes operating at least two control valves.

6. A method for improving traction and roadability in vehicles as set forth in claim 4 which includes operating at least three control valves.

7. An apparatus for improving traction and roadability in vehicles including wheels and wheel brake cylinders, comprising control elements (1a, 1b) embodied as hydraulic adjusting cylinders, said control elements (1a, 1b) are each connected to a traction-promoting system, said control elements being triggered by electrical signals provided by a traction control unit (ASR), upon triggering of said control elements, each of said control elements activate the traction promoting systems to promote increased wheel grip of the motor vehicle.

8. An apparatus as defined in claim 7, further wherein the motor vehicle includes gravel bins disposed ahead of driven wheels of the motor vehicle and the adjusting cylinders (1a, 1b) are arranged to open rotary slides provided in outlet openings of said gravel bins.

9. An apparatus as defined by claim 7, further wherein said traction control unit includes a sensor mounted adjacent each wheel of the motor vehicle and triggering of the adjusting cylinders (1a, 1b) is effected selectively and triggering is directed to the adjusting cylinder for the wheel detected by one of said sensors to be spinning.

10. An apparatus as defined by claim 7, in which said traction control unit includes a traction control valve (4), and said adjusting cylinders (1a, 1b) communicate with pressure medium outlet lines (4a, 4b; 12a, 12b) of a traction control valve (4) parallel to a triggering of said wheel brake cylinders.

11. An apparatus as defined by claim 6, which includes a pressure supply source (10), electromagnetic valves (3a, 3b) which communicate upstream with said pressure supply source (10) and downstream with said adjusting cylinders, and the electrical signals provided by the traction control unit to said traction control valve (4) are supplied in parallel to said electromagnetic valves 3a, 3b to promote simultaneous activation of the traction-promotion systems.

12. An apparatus as defined by claim 11, further wherein the electromagnetic valves (3a, 3b) communicating with the adjusting cylinders (1a, 1b) are triggered directly by an anti-skid system/traction control unit.

13. An apparatus as defined by claim 10, further wherein respective pressure medium lines that carry the pressure medium to said adjusting cylinders (1a, 1b) include throttles (2) for temporally delaying triggering of the adjusting cylinders during only transient traction control demands.

14. An apparatus for improving traction and roadability in vehicles including wheels and wheel brake cylinders, comprising control elements (1a, 1b) embodied as pneumatic adjusting cylinders, said control element (1a, 1b) are each connected to a traction promoting system, said control elements being triggered by electrical signals provided by a traction control unit, said traction control unit includes a traction control valve (4), and said adjusting cylinders (1a, 1b) communicate with pressure medium outlet lines (4a, 4b; 12a, 12b) of said traction control valve (4) parallel to a triggering of said wheel brake cylinders, and upon triggering of said control elements, each of said control elements activate the traction promoting system to promote increased wheel grip of the motor vehicle.

15. An apparatus as defined by claim 14, which includes a pressure supply source (10), electromagnetic valves (3i a, 3b) which communicate upstream with said pressure supply source (10) and downstream with said adjusting cylinders, and the electrical signals provided by the traction control unit to said traction control valve (4) are supplied in parallel to said electromagnetic valves 3a, 3b to promote simultaneous activation of the traction-promoting systems.

16. An apparatus as defined by claim 15, further wherein the electromagnetic valves (3a, 3b) communicating with the adjusting cylinders (1a, 1b) are triggered directly by an anti-skid system/tracing control unit.

17. An apparatus as defined by claim 14, further wherein respective pressure medium lines that carry the pressure medium to said adjusting cylinders (1a, 1b) include throttles (2) for temporally delaying triggering of the adjusting cylinders during only transient traction control demands.

18. An apparatus for improving traction and roadability in vehicles including driven wheels with tires thereon and wheel brake cylinders, comprising control elements (1a, 1b) embodied as pneumatic adjusting cylinders, said control element (1a, 1b) are each connected to a traction-promoting system, said control elements being triggered by electrical signals provided by a traction control unit, the pneumatic adjusting cylinders (1a, 1b) are arranged to press auxiliary wheels provided with sets of chains against side portion s of said tires of the driven wheels via a lever system, and upon triggering of said control elements, each of said control elements activate the traction promoting system to promote increased wheel grip of the motor vehicle.

19. An apparatus for improving traction and roadability in vehicles including driven wheels with tires thereon and wheel brake cylinders, comprising control elements (1a, 1b) embodied as pneumatic adjusting cylinders, said control element (1a, 1b) are each connected to a traction-promoting system, said control elements being triggered by electrical signals provided by a traction control unit, the pneumatic adjusting cylinders (1a, 1b) are arranged to press auxiliary wheels provided with sets of chains against side portions of said tires of the driven wheels via a rack and spindle drive system, and upon triggering of said control elements, each of said control elements activate the traction promoting system to promote increased wheel grip of the motor vehicle.

20. An apparatus for improving traction and roadability in vehicles including driven wheels and wheel brake cylinders, comprising control elements (1a, 1b) embodied as pneumatic adjusting cylinders, said control element (1a, 1b) are each connected to a traction-promoting system, said control elements being triggered by electrical signals provided by a traction control unit, upon triggering of said control elements, each of said control elements activate the traction promoting system to promote increased wheel grip of the motor vehicle, said motor vehicle includes gravel bins disposed ahead of said driven wheels of the motor vehicle, and the pneumatic adjusting cylinders are arranged to open rotary slides provided in outlet openings of said gravel gins.

21. An apparatus for improving traction and roadability in vehicles including driven wheels and wheel brake cylinders, comprising control elements (1a, 1b) embodied as pneumatic adjusting cylinders, said control element (1a, 1b) are each connected to a traction-promoting system, said control elements being triggered by electrical signals provided by a traction control unit, said traction control unit includes a sensor mounted adjacent each wheel of the motor vehicle and triggering of the adjusting cylinders (1a, 1b) is effected selectively and triggering is directed to the adjusting cylinder for the wheel detected by one of said sensors to be spinning, and upon triggering of said control elements, each of said control elements activate the traction promoting system to promote increased wheel grip of the motor vehicle.

* * * * *